US008024426B2

(12) United States Patent
Trikoz et al.

(10) Patent No.: US 8,024,426 B2
(45) Date of Patent: Sep. 20, 2011

(54) NON-DISRUPTIVE DATA PATH UPGRADE USING TARGET MOBILITY

(75) Inventors: Dmitry Trikoz, Waltham, MA (US);
Tom Middleton, Hingham, MA (US);
Robert Mulcahy, Sudbury, MA (US);
Ric Calvillo, Jr., Boston, MA (US);
Nicos Vekiarides, Natick, MA (US)

(73) Assignee: Texas Memory Systems, Inc., Houston, TX (US)

( * ) Notice: Subject to any disclaimer, the term of this patent is extended or adjusted under 35 U.S.C. 154(b) by 222 days.

(21) Appl. No.: 12/118,332

(22) Filed: May 9, 2008

(65) Prior Publication Data

US 2009/0103432 A1    Apr. 23, 2009

Related U.S. Application Data

(60) Provisional application No. 60/917,483, filed on May 11, 2007.

(51) Int. Cl.
*G06F 15/16* (2006.01)
(52) U.S. Cl. ......................................................... 709/218
(58) Field of Classification Search .................. 709/218; 714/4
See application file for complete search history.

(56) References Cited

U.S. PATENT DOCUMENTS

| | | | | |
|---|---|---|---|---|
| 5,933,422 A * | 8/1999 | Kusano et al. | ................. | 370/331 |
| 5,987,526 A * | 11/1999 | Morales | ........................ | 709/249 |
| 5,987,621 A * | 11/1999 | Duso et al. | .................... | 714/4.11 |
| 6,011,780 A * | 1/2000 | Vaman et al. | ................. | 370/237 |
| 6,041,381 A * | 3/2000 | Hoese | ............................. | 710/315 |
| 6,078,990 A * | 6/2000 | Frazier | ........................... | 711/114 |
| 6,105,122 A * | 8/2000 | Muller et al. | ..................... | 712/1 |
| 6,148,349 A * | 11/2000 | Chow et al. | ..................... | 710/33 |
| 6,181,679 B1 * | 1/2001 | Ashton et al. | ................. | 370/244 |
| 6,388,995 B1 * | 5/2002 | Gai et al. | ...................... | 370/256 |
| 6,718,383 B1 * | 4/2004 | Hebert | .......................... | 709/224 |
| 6,763,479 B1 * | 7/2004 | Hebert | .......................... | 714/4.11 |
| 6,769,071 B1 | 7/2004 | Cheng et al. | ...................... | 714/4 |
| 6,909,695 B2 | 6/2005 | Lee et al. | ...................... | 370/238 |
| 7,130,909 B2 | 10/2006 | Yamashita et al. | ............ | 709/226 |
| 7,363,399 B2 | 4/2008 | Shum et al. | ..................... | 710/52 |
| 7,406,617 B1 * | 7/2008 | Athreya et al. | .............. | 714/4.11 |
| 7,502,884 B1 * | 3/2009 | Shah et al. | ..................... | 710/316 |
| 7,561,593 B1 * | 7/2009 | Wilkie | .......................... | 370/450 |
| 7,734,712 B1 * | 6/2010 | Meyer et al. | .................. | 709/213 |
| 7,839,766 B1 * | 11/2010 | Gardner | ........................ | 370/218 |
| 2002/0152320 A1 * | 10/2002 | Lau | ................................ | 709/238 |
| 2002/0161923 A1 * | 10/2002 | Foster et al. | .................. | 709/239 |

(Continued)

*Primary Examiner* — John Follansbee
*Assistant Examiner* — Imad Hussain
(74) *Attorney, Agent, or Firm* — Locke Lord Bissell & Liddell LLP

(57) ABSTRACT

Described are computer-based methods and apparatuses, including computer program products, for non-disruptive data path modification using target mobility. A management server is in communication with a switching fabric. The switching fabric is in communication with a host and a data storage element. The management server creates a takeover target based on a primary target, where the primary target is part of a virtual data path between the host and the data storage. The switching fabric, through the direction of the server, modifies metadata associated with the virtual data path to expose the takeover target so that the takeover target becomes part of the virtual data path. The management server unexposes the primary target so that the primary target is no longer part of the virtual data path. The delay between exposing the takeover target and unexposing the primary target is sufficiently small to prevent an error condition from occurring at the host.

23 Claims, 5 Drawing Sheets

U.S. PATENT DOCUMENTS

| | | | |
|---|---|---|---|
| 2003/0093563 A1* | 5/2003 | Young et al. | 709/245 |
| 2005/0228943 A1 | 10/2005 | DeCenzo et al. | 711/114 |
| 2006/0031447 A1* | 2/2006 | Holt et al. | 709/223 |
| 2006/0236068 A1 | 10/2006 | Li et al. | 711/173 |
| 2007/0124535 A1* | 5/2007 | Kashima et al. | 711/114 |
| 2008/0228987 A1* | 9/2008 | Yagi et al. | 710/316 |

* cited by examiner

NON-DISRUPTIVE DATA PATH UPGRADE USING TARGET MOBILITY

CROSS REFERENCES TO RELATED APPLICATIONS

This application relates to and claims the benefit and priority of provisional application entitled "Non-Disruptive Data Path Upgrade Using Target Mobility," U.S. Patent Application No. 60/917,483, filed on May 11, 2007, the disclosure of which is hereby incorporated herein by reference.

FIELD OF THE INVENTION

The present invention relates generally to computer-based methods and apparatuses, including computer program products, for modifying a data path using target mobility.

BACKGROUND

With the increasing importance of electronic data in both the personal and commercial setting, data redundancy is essential. Computer systems may include both local and remote storage devices connected to the computer systems through one or more communication connections (e.g., local area networks, wide area networks, and the like). The connections between systems may be over various mediums, such as coaxial cable, category five ethernet, gigabit ethernet, firewire, fiber cable, and other data connections. The storage devices can be single discs, flash drives, tape drives, redundant arrays of independent discs (RAIDs), data servers, and other mass storage devices. Typically, the system interface to these storage devices is a host processor. A host processor may perform a variety of data processing tasks and operations using the data storage system. For example, a host processor may perform system input and output (I/O) operations in connection with data requests (e.g., data read and write operations), as well as administrative tasks (e.g., data backup and disc mirroring operations).

Regardless of in-home or office use, the data storage software and devices should be non-disruptive to applications and hosts. For example, it is desirable to have limited application down time when making changes to the mechanism used for storage. Many data storage products offer redundancy to prevent application outages during software upgrades and modifications. To facilitate remote access to the data storage devices, servers or hosts can access the data storage devices over a storage data path. However, the risk of application disruption is not solved by redundancy if a portion of a product needs to be taken offline during an upgrade or modification. Taking that portion of the product offline requires that all servers or hosts attached to that data path, change their data path information, either by fail over or by using a new data path, automatically.

Alternately, the host and remote storage devices can use multi-pathing software. For example, when a path to a storage device fails, the system can reroute the I/O operations destined for a particular storage device to the storage system through an available redundant path. This can be extended to allow for merging and upgrading systems when the host-path to the initial computer is switched to the path of an alternate server. While host-pathing software can typically handle the transition from one data path to the other without causing application failure, the burden of application availability falls on the host software rather than the storage product because the host manages the pathing routes. For example, the host multipathing software would fail over I/O from one port to another port. Taking a portion of a storage product offline also decreases the number of functional paths from a host during the course of the upgrade, which can impact performance.

An example, of impact to performance is a decrease in functional paths. This introduces a vulnerability window where high availability may be compromised with only one functional host path instead of two. Further, there is typically a noticeable decrease in performance from the loss of a functional path. Additionally, susceptibility to host-pathing software errors in handling the path transition correctly can result in application failures and, often, costly downtime.

SUMMARY OF THE INVENTION

The techniques described herein provide methods and apparatuses for non-disruptive data path modification using target mobility. In one aspect, there is a method executed by a management server in communication with a switching fabric, the switching fabric being in communication with a host and a data storage. The method includes creating a takeover target based on a primary target, the primary target being part of a virtual data path between the host and the data storage. Metadata associated with the virtual data path is modified to expose the takeover target so that the takeover target becomes part of the virtual data path. The method further includes unexposing the primary target so that the primary target is no longer part of the virtual data path, wherein a delay between exposing the takeover target and unexposing the primary target is sufficiently small to prevent an error condition from occurring at the host.

In another aspect there is a system. The system includes a switching fabric in communication with a host and a data storage and a primary target within the switching fabric. The system further includes a virtual data path associated with the host, the primary target, and the data storage. A management server in communication with the switching fabric is configured to create a takeover target based on the primary target. The management server is further configured to modify metadata associated with the virtual data path to expose the takeover target so that the takeover target becomes part of the virtual data path. The management server is further configured to unexpose the primary target so that the primary target is no longer part of the virtual data path, wherein a delay between exposing the takeover target and unexposing the primary target is sufficiently small to prevent an error condition from occurring at the host.

In another aspect, there is a computer program product. The computer program product is tangibly embodied in a computer readable medium. The computer program product includes instructions being operable to cause a data processing apparatus to create a takeover target based on a primary target, the primary target being part of a virtual data path between a host and a storage device. The computer program product further includes instructions being operable to modify metadata associated with the virtual data path to expose the takeover target so that the takeover target becomes part of the virtual data path. The primary target is unexposed so that the primary target is no longer part of the virtual data path, wherein a delay between exposing the takeover target and unexposing the primary target is sufficiently small to prevent an error condition from occurring at the host.

In another aspect there is a system. The system includes a virtual path between a host and a storage device. The system further includes means for creating a takeover target based on a primary target, the primary target being part of the virtual data path between the host and the storage device. The system includes means for modifying metadata associated with the virtual data path to expose the takeover target so that the takeover target becomes part of the virtual data path. The method includes means for unexposing the primary target so that the primary target is no longer part of the virtual data path, wherein a delay between exposing the takeover target and unexposing the primary target is sufficiently small to prevent an error condition from occurring at the host.

In other examples, any of the aspects above can include one or more of the following features. The metadata is modified to expose the primary target so that the primary target becomes part of the virtual data path. The takeover target is unexposed so that the takeover target is no longer part of the virtual data path, wherein a second delay between exposing the primary target and unexposing the takeover target is sufficiently small to prevent an error condition from occurring at the host. At least one of a hardware, a software, or a firmware associated with the primary target is modified, wherein the modification does not affect the virtual data path. The modification includes upgrading the software, upgrading the firmware, repairing the hardware, replacing the hardware, power cycling the hardware, rebooting the hardware, or any combination thereof.

The error condition is a fail over from a first port to a second port, or the error condition is a standard system notification. The intelligent switching fabric includes a network infrastructure, the network infrastructure supporting a computer to computer communication, storage to storage communication, computer to storage communication, or any combination thereof. The network infrastructure includes Fibre channel, Infiniband, SCSI, iSCSI, TCP/IP, or any combination thereof.

When the takeover target is exposed, a namespace conflict is resolved. The namespace conflict is resolved by exposing a target world wide name, a virtual target world wide name, or any combination thereof. When the takeover target is exposed, a host command is redirected from the target node to the takeover node. The host command includes an input and output operation. The takeover target has a same attribute as the primary target. In some implementations, the same attribute is an identical volume exposure, a world wide name, a small computer systems interface identity, or any combination thereof.

The switching fabric is further configured to modify the metadata to expose the primary target so that the primary target becomes part of the virtual data path. The management server is further configured to unexpose the takeover target so that the takeover target is no longer part of the virtual data path, wherein a second delay between exposing the primary target and unexposing the takeover target is sufficiently small to prevent an error condition from occurring at the host. The switching fabric is further configured to receive commands from the management server and manage a virtual data path exception, a virtual data path error, or both.

The primary target is associated with a primary node. The takeover target is associated with a takeover node. The primary node, the takeover node, or both include a first network card configured to communicate with the switching fabric and a second network card configured to communicate with the management server. The data storage is configured to store the metadata. The virtual data path includes a small computer system interface (SCSI) target connection, a switched fabric connection, a redundant array of inexpensive discs (RAID) connection, or any combination thereof.

The non-disruptive data path upgrade using target mobility techniques described herein can provide one or more of the following advantages. An advantage is online upgrades of a storage data path or storage product can be performed in a manner that is non-disruptive. Servers, or hosts, attached to the data path, can experience limited no I/O failures or path failures. Advantageously, there is often no perceivable decrease in data availability from loss of paths during the course of the upgrade.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

In general overview, a management server is in communication with a switching fabric. The switching fabric is in communication with a host and a data storage element. The management server creates a takeover target based on a primary target, where the primary target is part of a virtual data path between the host and the data storage. The switching fabric, through the direction of the server, modifies metadata associated with the virtual data path to expose the takeover target so that the takeover target becomes part of the virtual data path. The management server unexposes the primary target so that the primary target is no longer part of the virtual data path. The delay between exposing the takeover target and unexposing the primary target is sufficiently small to prevent an error condition from occurring at the host.

Figure 1:
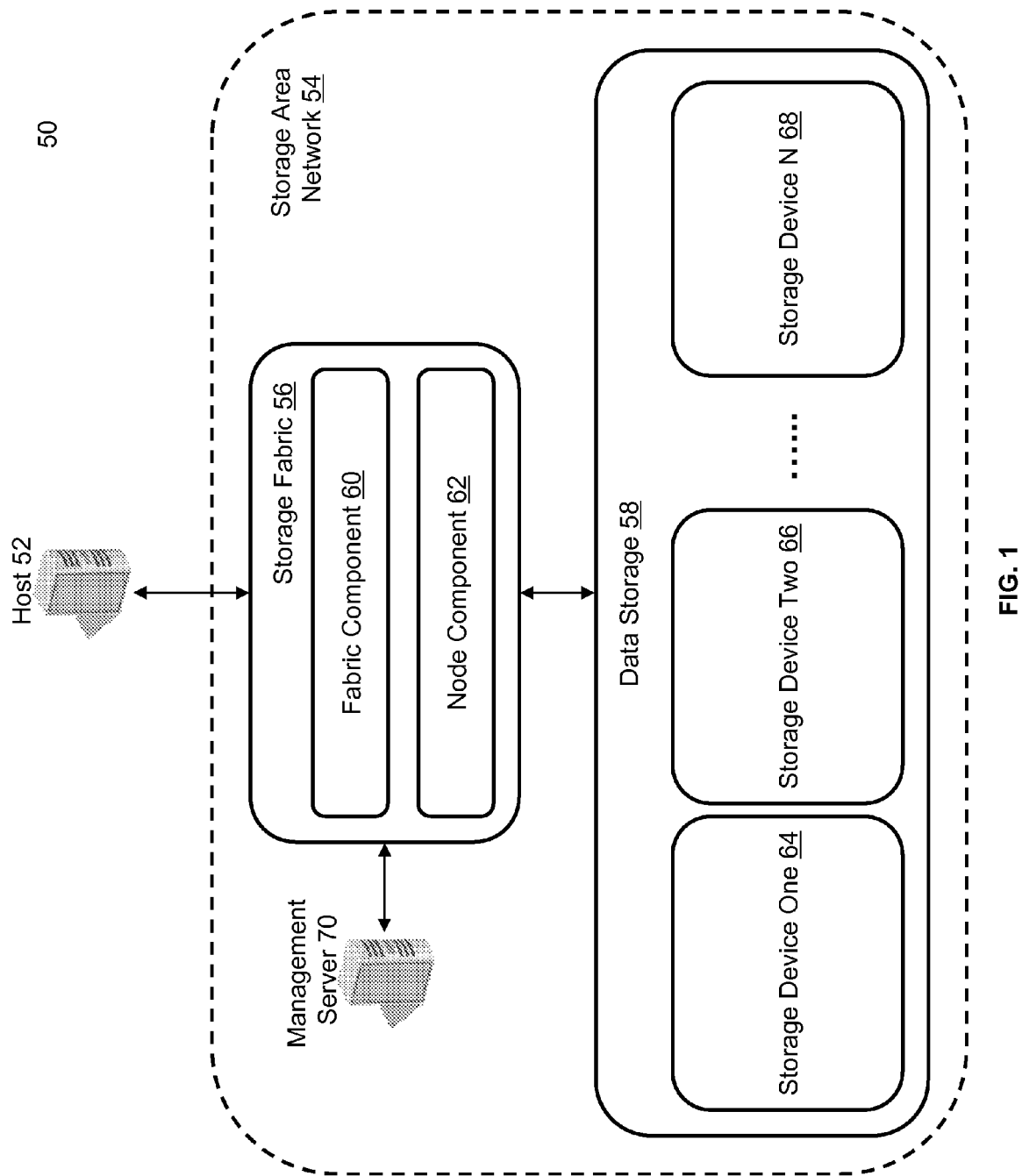
FIG. 1 depicts a system with non-disruptive data path modifications with target mobility.

FIG. 1 is a system 50 for non-disruptive data path modifications with target mobility. The terms "upgrade" and "modification" in this application can be used interchangeably. The system 50 includes a host 52 connected to a storage area network 54. The storage area network 54 includes a storage fabric 56 in communication with a data storage 58. The storage fabric 56 includes a fabric component 60 and a node component 62. The fabric component 60 can include one or more devices. The fabric component 60 connects the host 52 to the node component 62. The node component 62 can include one or more nodes. The node component connects the fabric component 60 to the data storage 58. The data storage 58 includes storage devices such as storage device one 64, storage device two 66, up through storage device N 68, where N can be any positive integer. The management server 70 is in communication with the storage fabric 56. The management server 70 can, for example, execute commands to one or more nodes in the node component 62.

The storage fabric 56 abstracts the data storage 58 from the host 52. Because the storage fabric 56 is external to the data storage 58, the storage area network 54 can operate with any type, kind, or brand of storage devices. A storage device can be coupled to and removed from the storage area network 54. Additionally, because the node component 62 is abstracted from the host 52 by the fabric component 60, the node component 62 can be modified and/or upgraded transparently to the host 52. The storage fabric 56 provides one or more virtual data paths (e.g., a path from the host 52 to a storage device such as storage device one 64) to the host. The virtual data path allows components in the storage area network 54 (e.g., components in the node component 62, components in the data storage 58, and/or the like) to be modified while presenting an unchanged data path representation to the host 52. Advantageously the host 52 may not need to resort to local path management functionality (e.g., multipathing) due to components being removed from the storage area network 54. For example, the storage fabric 56 can continue to support a virtual data path while migrating from a first node in the node component 62 to a second node in the node component 62.

In one embodiment, information for the storage fabric 56 (e.g., the node component 62 configuration) is stored on one or more of the storage devices of the data storage 58. For example, storage device one 64 has a metadata repository (not shown) to store metadata regarding the configuration of one or more nodes in the node component 62. The metadata can be persistent or non-persistent. In some examples, the metadata resides only in computer memory. The management server 70 executes a command to a node in the node component 62. The node component 62 updates the metadata in the repository based on the command. For example, if the management server 70 requests a takeover target to duplicate at least some of the attributes of a primary target that is supporting a virtual data path, the takeover target duplicates those attributes and updates the metadata accordingly. The storage fabric is typically an industry standard network infrastructure which supports any combination of computer to computer, storage to storage, or computer to storage communication. The storage fabric typically supports industry standard mediums and protocols (e.g., Fibre channel, Ethernet, Infiniband, SCSI, iSCSI, TCP/IP, or other similar protocols). The storage fabric includes a fabric resident software application primarily used for I/O data-path exception and error processing. Such a storage fabric is considered "intelligent." The software application is controlled by the management server.

Figure 2A:
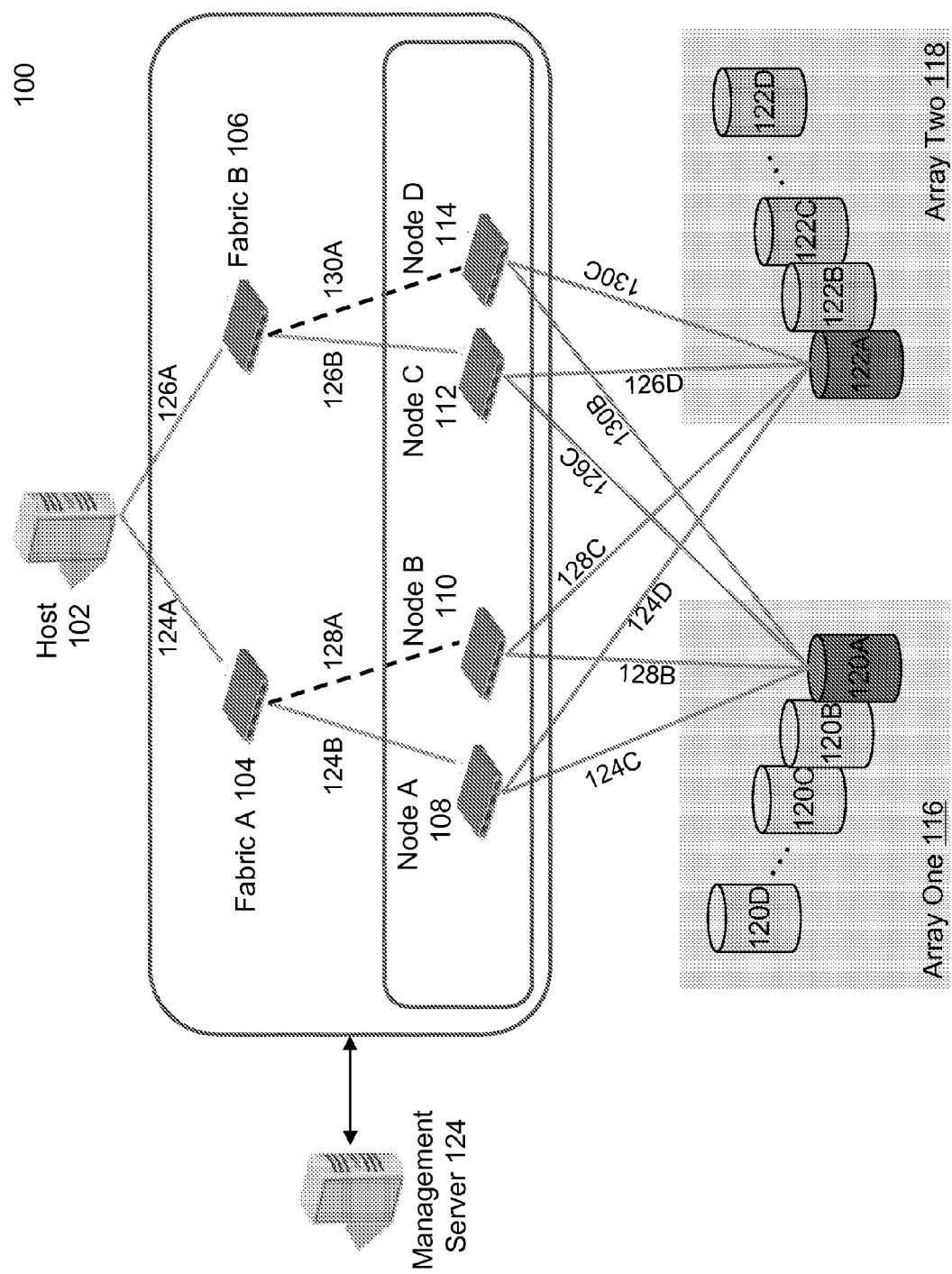
FIG. 2A depicts a system with non-disruptive data path modifications with target mobility before node migration.

FIG. 2A is a system 100 for non-disruptive data path modifications with target mobility before node migration. The system 100 includes a host 102. The host 102 can be any standard computer system (e.g., including a CPU and memory). An example of a host 102 is an 1U rack mount Intel based server comprising a motherboard (MLB) with processor, memory and communication interfaces for inter-computer and storage to computer communications. The host 102 is in communication with fabric A 104 and fabric B 106. Fabric A 104 is in communication with node A 108 and node B 110. Fabric B is in communication with node C 112 and node D 114. The configuration can consist of any number of attached hosts. The hosts can run a variety of heterogeneous operating systems. The hosts in the system (e.g., the system 100) can have one or multiple storage data paths (running, for example, Incipent iNSP software). Each node is, for example, an independent instance of software, typically running on dedicated hardware. A node pair (e.g., node A 108 and node C 112) is a pair of instances of software, each typically running on dedicated hardware, working in tandem to increase availability. The node can be a switch between the host 102 and array one 116 and array two 118. The node can have multiple switching cards. For example, the node can include a first switching card to facilitate operation of the fabric and a second switching card to operate as an intelligent element of the fabric, receiving and executing commands from the management server. The node can have a processor (not shown) in communication with the second switching card to run the software application.

Node A 108, node B 110, node C 112, and node D 114 are in communication with array one 116 and array two 118. Fabric A 104 and fabric B 106 can be, for example, the storage fabric between host 102 and the remote data storage associated with host 102 (e.g., array one 116 and array two 118). Array one 116 and array two 118 can include one or more storage discs (e.g., discs 120A through discs 120D and discs 122A through 122D, respectively). The arrays can be, for example, RAID arrays. The management server 124 is in communication with the nodes (e.g., node A 108 through node D 114) and the fabric components (e.g., fabric A 104 and fabric B 106). The management server 124 can execute commands to the nodes to coordinate node migration (e.g., migrating from a virtual data path using node A 108 to a using node B 110 without disrupting I/O operations).

Host 102 has a data path with connection 124A to fabric A 104, connection 124B from fabric A 104 to node A 108, connection 124C from node A 108 to array one 116, and connection 124D from node A array two 118 (collectively referred to as data path 124). The data path (e.g., data path 124) can be intelligent Fibre Channel (FC) switch modules, SCSI-compatible disk devices, RAID arrays, and/or the like. The host 102 has a data path with connection 126A to fabric B 106, connection 126B from fabric B 106 to node C 112, connection 126 C from node C 112 to array one 116, and connection 126D from node C to array two 118 (collectively referred to as data path 126). Fabric A has a data path to array one 116 and array two 118 through node B 110 (i.e., data paths 128A, 128B, and 128C, collectively referred to as data path 128). Fabric B 106 has a data path to array one 116 and array two 118 through node D 114 (i.e., data paths 130A, 130B, and 130C, collectively referred to as data path 130). The four data paths (i.e., data paths 124, 126, 128, and 130) are switch-based data paths. Nodes A 116 and C 112 are in the active data path and are referred to herein as the source nodes or primary targets. Nodes B 110 and D 114 are in the desired new data path and are referred to herein as target nodes or takeover targets. Connections 124B and 126B have solid lines to indicate nodes A 108 and C 112 are exposed to the host 102. Because nodes A 108 and C 112 are exposed, data I/O from the host 102 is directed through the nodes to the data storage. Connections 128A and 130A have dotted lines to indicate nodes B 110 and D 114 are unexposed to the host 102. Since nodes B 110 and D 114 are unexposed, any data I/O, for example, directed from host 102 does not pass through nodes B 110 and D 114. The arrays connect to the data paths and house metadata (i.e., information describing the layout of data). The metadata can be housed in, for example, data volumes, called repositories, on specific discs in the array (e.g., disc 120A of array one 116, which can be reserved as a repository disc). In some implementations the metadata is stored in volatile memory such as RAM.

Hosts may communicate directly with targets on nodes, but typically are connected to the targets via a storage fabric (e.g., fabric A 104 and fabric B 106). For example, a system employing two nodes allows each node to have full access to all storage such that anyone node in the cluster can expose any target that is currently exposed on a different node. Four nodes can allow a minimum of two nodes to actively present storage to hosts even when the other two nodes are being upgraded or administered. Nodes (e.g., node A 108 through node D 114) can have symmetric connectivity to all storage (e.g., array one 116 and array two 118) at all times. For example, both nodes A 108 and C 120 can simultaneously be connected to the host 102 and the data storage arrays one 116 and two 118. In the event node A 108 fails, data operations (e.g., data I/O) can still be delivered to the data storage through node C 112. Node connectivity can allow a non-disruptive software upgrade to occur without physical reconfiguration of storage resources. The targets for each node can be further abstracted into multiple layers of target exposures. For example, one primary target (e.g., an SDV target) points to two targets. If one target fails, the primary target fails over to the second target. The primary target can switch from one target to another target due to an external situation (e.g., instructions from a management console).

Figure 2B:
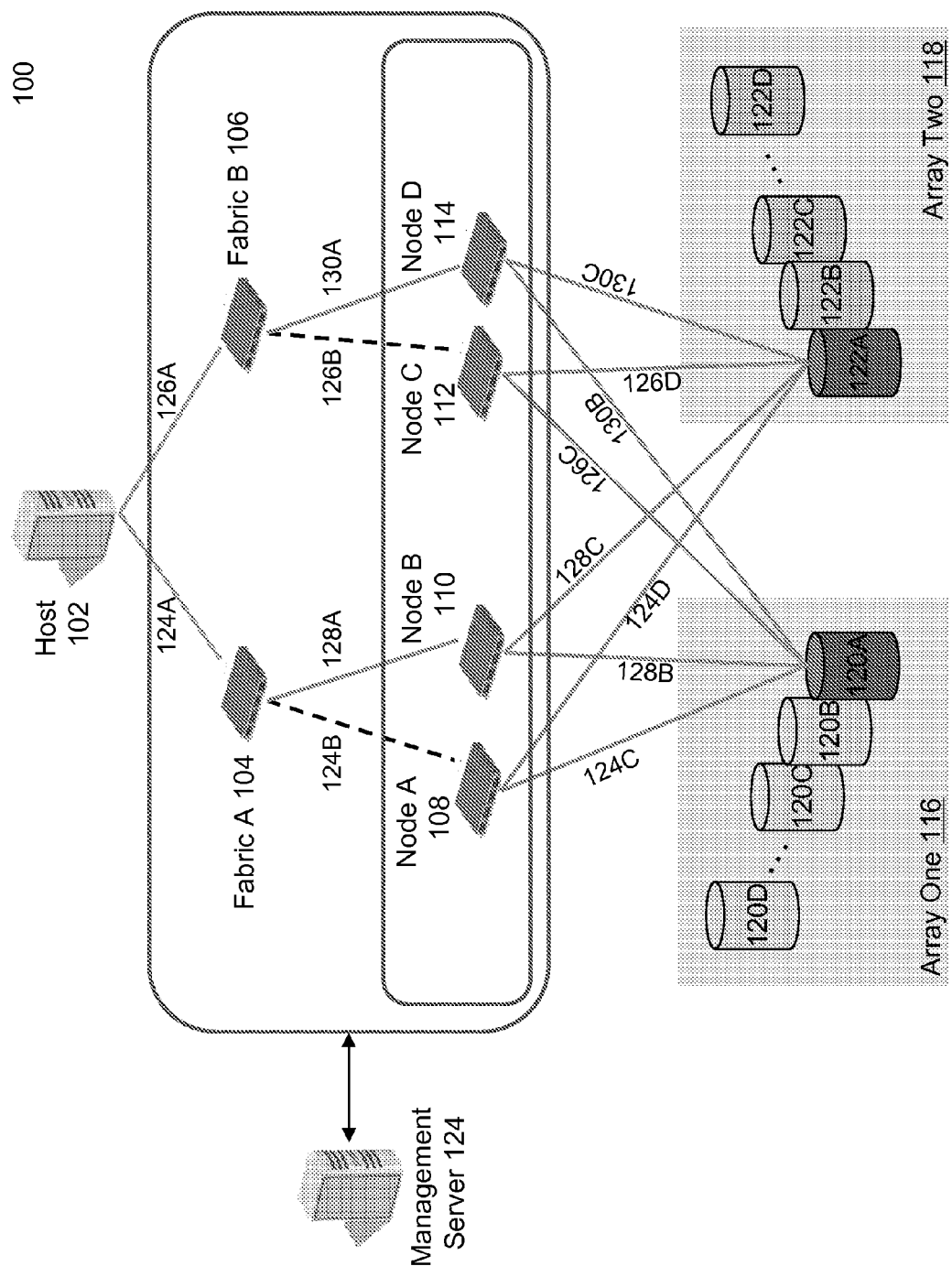
FIG. 2B depicts a system with non-disruptive data path modifications with target mobility after node migration.

FIG. 2B is the system 100 of FIG. 2A for non-disruptive data path modifications with target mobility after node migration. Connections 124B and 126B are depicted with dashed lines to indicate node A 108 and node C 112 are unexposed. An unexposure is achieved through, for example, explicitly making a logical storage device unavailable to one or more servers. Node A 108 and node C 112 are unavailable to host 102. Connections 128A and 130A are depicted with solid lines to indicate nodes B 110 and D 114 are exposed to the host 102. An exposure is achieved through, for example, explicitly making a logical storage device available to one or more servers. Node B 110 and node D 114 are available to host 102. As will be explained, all data I/O is processed through data paths 128 and 130. Node A 108 and C 112 can be upgraded or modified because they are unexposed from host 102. Upon completion of the upgrades, node pairs A 108 and C 112 can be re-exposed and node pairs B 110 and D 114 can be unexposed in a similar manner.

The host 102 remains unaware of the node migration from nodes A 108 and C 112 to nodes B 110 and D 114. The management server 124 can coordinate the switch between nodes so the delay is small enough to prevent the host 102 from detecting an error in the migration. In some embodiments, the operation is atomic. For example, in some implementations, the system 100 updates routing tables to switch from nodes A 108 and C 112 to nodes B 110 and D 114. A message (e.g., a standard message for a Fibre Channel communication protocol) is sent to the host 102 to indicate the routing tables were updated to migrate from nodes A 108 and C 112 to nodes B 110 and D 114, respectively. The host 102 uses the updated routing tables to manage the data path. Because the host 102 uses the updated routing tables, any delay associated with switching between the nodes is not communicated to the host 102.

Figure 3:
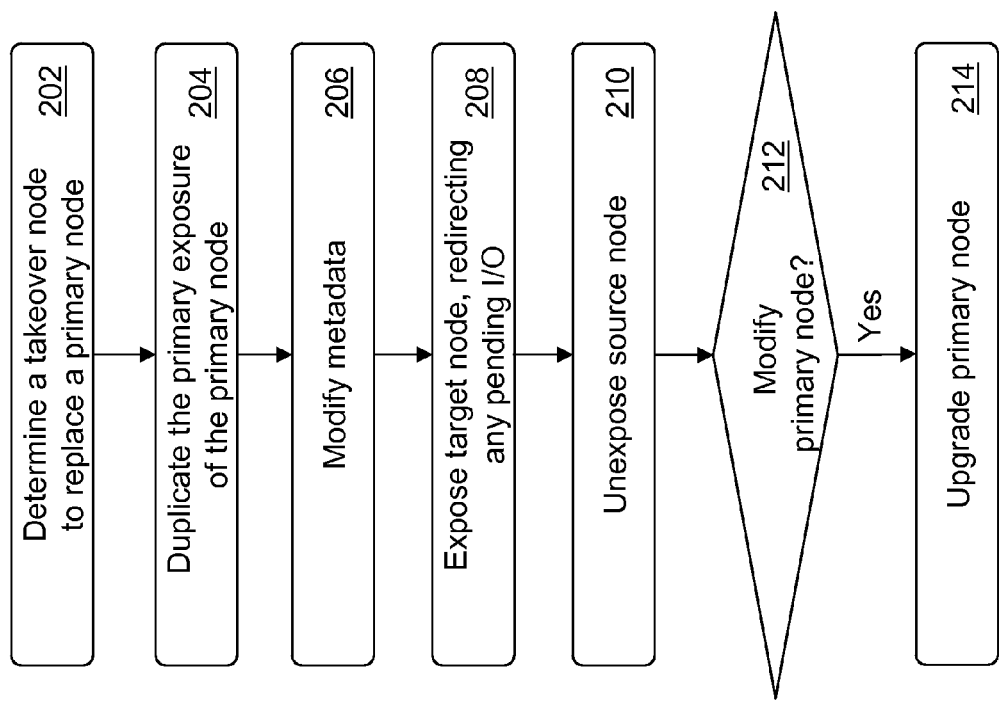
FIG. 3 depicts a flow diagram of non-disruptive data path modifications with target mobility.

FIG. 3 depicts a flow diagram of non-disruptive data path modifications with target mobility 200. For example, referring to the four node cluster of system 100 in FIGS. 2A and 2B, it is desirable to migrate virtual targets 124B and 126B exposed on node A 108 and node C 112, respectively, to node pairs B 110 and D 114. Before performing an upgrade of, for example, node A 108 and node B 110, the host is attached to active data paths with pending transactions in progress through the data path (e.g., data path 124 and data path 126). The pending transactions can be, for example, disk I/O from host 102A to array one 116 and array two 118. A management server (e.g., the management server 124) determines 202 a takeover node to replace a primary node.

The management server duplicates 204 the takeover exposure for the takeover node based on the primary exposure of the primary node (e.g. a duplicate target SCSI node with attributes of the original SCSI node). In some embodiments, the host (e.g., the host 102) uses a subset of the full set of attributes associated with the takeover exposure and primary exposure. The attributes used by the host are duplicated so the host interacts with the takeover exposure as it would with the primary exposure. The duplication can be performed using, for example, management commands to control and coordinate the migration of target exposures and the software upgrade of individual nodes so the process is seamless and non-disruptive to attached hosts (e.g., host 102). The metadata is modified 206 to include the new data path information. The takeover node (e.g., node B 110 or node D 114) is exposed 208 such that any pending I/O originally intended for the primary node is redirected through the takeover node. The source node (e.g., node A 108 or node C 112) is unexposed 210 to prevent data I/O from passing through the primary node. For example, this can be coordinated for SCSI targets so namespace conflicts are resolved for attached hosts and/or fabric-attached hosts. If the primary node is to be upgraded 212, the unexposed node can be modified 214 without influencing the data path. The upgrade can include, for example, upgrading data path software, upgrading data path firmware, upgrading or replacing data path hardware, power cycling data path hardware, rebooting data path hardware, and/or the like. Upon completion, the original targets (e.g., SCSI targets) can be restored.

The virtual data paths from each source node (e.g., node A 108 and node C 112) to the arrays (e.g., array one 116 and array two 118) are migrated to the target nodes. In some examples, the migration exposes an existing SCSI target on node A 108 on node B 110, seamlessly redirecting host I/O to that second node. If operated over a FC SAN, the management server exposes a target world wide name (i.e., a WWN, namely that uniquely identifies a target that connects storage volumes to the host), from one node on a second node. This causes the host to view the second node as if it were the first node, thereby seamlessly redirecting ongoing host I/O to that second node. In some examples with an intelligent switch, (i.e., an FC SAN which allows virtual WWN's), the management server exposes a virtual target WWN on one node on a second node, seamlessly redirecting ongoing host I/O to that second node.

Typically, hosts are connected to two or more nodes which provide a target exposure for each volume, with the host having a separate physical path to each node (utilizing a minimum of two separate storage fabrics). For example, referencing FIG. 2A, the primary targets (124B and 126B) are initially exposed on node A 108 and node C 112. Nodes B 110 and D 114, to which the host has paths which are 128A and 130A, are not initially exposing any targets to the host 102. The host has physical connectivity to all four nodes in this configuration. The physical connectivity of the hosts may not need to change during the upgrade/modification process. Not changing the physical connectivity of the hosts can, for example, allow the target migration and subsequent upgrade/modification to happen seamlessly without physical reconfiguration of the hosts. Because the hosts are connected to the data storage through a storage fabric, the physical network and storage layout is hidden from the host. The host conducts operations (i.e., data I/O) without the knowledge of which nodes are selected by the management console to facilitate the virtual data path. Referencing FIG. 2A for example, if the management server switches from node A 108 to node B 110, the host 102 remains completely unaware of the node change.

The storage fabric of the system resides outside of the storage devices. And therefore, advantageously, the abstraction of the data storage facilitates the use of low-cost storage devices. Storage devices can be replaced and added without impacting the system. The storage fabric connectivity (e.g., fabric A 104 and fabric B 106) between the host and the nodes also allows nodes to be switched between without causing an error condition on the host side. For example, the nodes are switched between with a delay sufficiently small to prevent an error condition from occurring on the host so the host does not switch over from one port to a second port (i.e., multipath). Error conditions in similar magnitude to a failover from a first port to a second port (e.g., due to monitoring notifications during standard system operation) are avoided. Secondary notification may occur based on the host operating system and communication infrastructure which is normally utilized for transient non-critical level events. Specifically, if the host 102 is attached directly to nodes A 108 and C 112 instead of through a storage fabric, host 102 could lose connectivity once its primary node pair (i.e., nodes A 108 and C 112) goes offline during the course of the upgrade.

Figure 4:
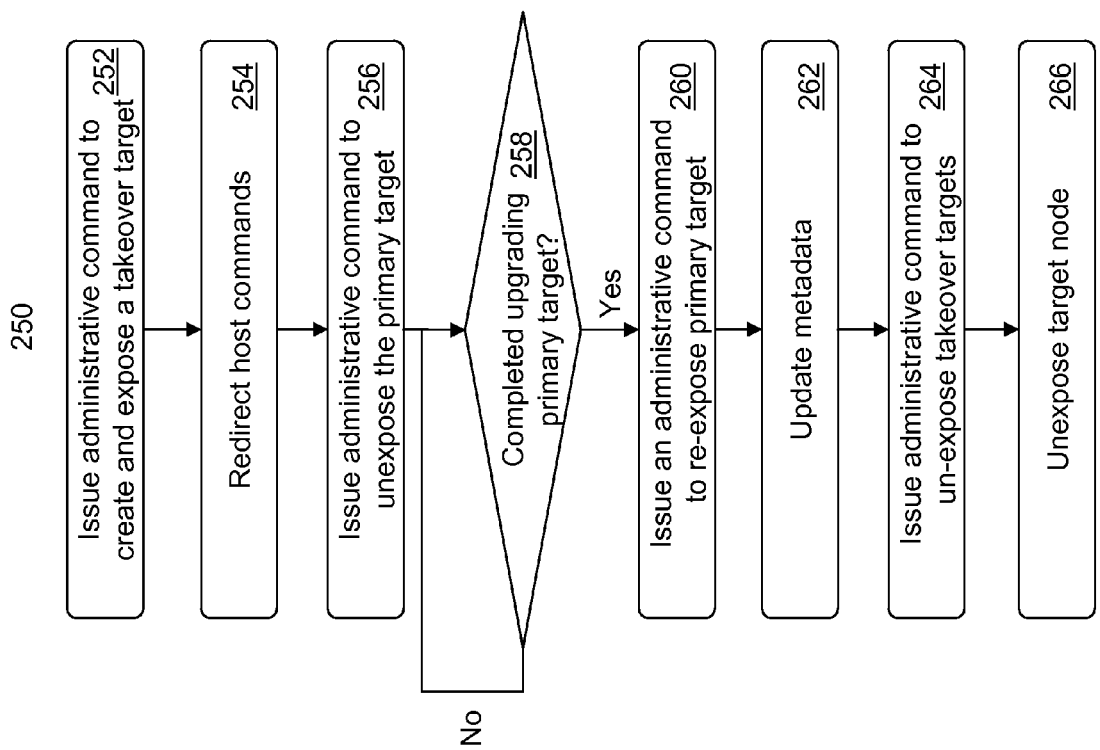
FIG. 4 depicts a flow diagram of an online node migration for a non-disruptive data path modifications with target mobility with reversion back to the primary target.

FIG. 4 depicts a flow diagram of an online node migration for a non-disruptive data path modifications with target mobility 250 with reversion back to the primary target. The management server issues 252 an administrative command to create and expose a takeover target or targets (e.g., on node pairs B 110 and D 114) that are configured, for the most part, identically to the takeover target (e.g., on node pairs A 108 and C 112). The command ensures that each takeover target has generally identical attributes with its corresponding primary target. This can include, for example, identical volume exposures through logical unit numbers (LUNs) for the same underlying volumes exposed by the primary targets having an identical SCSI identity, consisting of SCSI inquiry string, mode pages and/or other SCSI attributes used by hosts. The takeover target does not need to have exactly identical attributes, indeed, only the attributes used by the host typically are direct copies. In some examples, if the system employs FC SANs, takeover targets have the same exact WWNs as the primary targets. Identical WWNs can ensure that the host (e.g., host 102) cannot distinguish between a volume presented by a primary target and the same volume presented by a takeover target. Once the takeover targets are active into the host fabric, management server seamlessly redirects 254 host commands to the new takeover target or targets. The system facilitates the switch by avoiding failures, perceived outages, reduction in availability, and/or the like. The process can atomically replace a primary target with a takeover target in a manner imperceptible to a host accessing remote data storage. For example, the SCSI software/hardware stack on a host operating system does not sense a change in the data path.

The management server issues an administrative command to unexpose 256 primary target or targets (e.g., node pairs A 108 and C 112). The atomic replacement of the primary targets by the takeover targets in step 252 did not involve unexposing the primary targets. For example, although data I/O has been redirected through the takeover target, the takeover target is not yet been removed from the storage fabric. The primary targets can be unexposed from the host to prevent any unintended use of the primary targets on nodes A 108 and C 112 during the course of the upgrade. In the case of FC SANs, for example, minimizes the window during which identical targets are exposed across all four nodes. Minimizing the window can eliminate potential reconnection with primary targets. For example, fabric outages may cause the host to reconnect with the primary targets and have the unintended consequence of a host outage during the upgrade.

The primary targets (e.g., node pairs A 108 and C 112) are upgraded 258, the data path hardware is rebooted or reset, and other administrative tasks are performed. The management server issues 260 an administrative command to re-expose the primary targets. This process is similar to the process detailed in step 252 except this involves atomically replacing the takeover targets that the hosts are using with similarly configured primary targets. For example, the host 102 switches over to using primary targets on node pairs A 108 and C 112 in a manner generally imperceptible to the SCSI software/hardware stack on the host 102 operating system. Metadata is updated 262 (e.g., by the nodes) to reflect the virtual path changes.

The management server issues 264 an administrative command to unexpose takeover targets (e.g., on node pairs B 110 and D 114). Once the host returns to using the primary targets, the takeover targets are unexposed 266 for reasons similar to those described in step 256. Depending on the amount of time allotted to the upgrade/modification process, this procedure can be used to migrate all targets at once or sequentially over a longer period of time. In either case, a node cannot be upgraded until all exposed targets are moved off of that particular node.

In a preferred embodiment, an Incipient® Network Storage Platform (iNSP®) cluster is configured so SCSI target exposures (e.g., targets that make volumes visible to attached hosts via the SCSI protocol) can be migrated from one pair of iNSP® instances, or an iNSP® node pair, to a second pair of iNSP® instances, or iNSP® node pair, without any perceived disruption to host I/O or loss of exiting paths. After the migration occurs, the original node pair can be upgraded in a manner completely decoupled from the attached hosts and user applications running on the hosts.

The procedure described above ensures that the node upgrade occurs without any downtime or even detection of any failure at the host and application level. Additionally, no loss of host paths occurs, giving the host the same availability and performance capability it had prior to the upgrade process. This procedure effectively mitigates possible side effects mentioned earlier that may occur during an upgrade. Among other advantages, the procedure avoids compromised high availability with only one functional host path instead of two, a noticeable decrease in performance from the loss of a functional path, and susceptibility to host-pathing software glitches in handling the path transition correctly. Such possible side effects can result in application failures and costly downtime. Many servers operate at a highest efficiency by optimizing use of the processors. Down-time in processors means idle-time for they system, which is a waste of resources. In multi-processor environments, it is critical for all data operations to be completed on schedule. Causing data operations to be buffered or queued cascades throughout the system, affecting all subsequent operations. Abstracting the host from the data storage through the storage fabric, the host has the same number of operational paths to the data storage as it did prior to the upgrade. There is no loss of a functional path as all paths are still functional from the host perspective. There can still be a decrease in performance from taking parts of the system offline, for example, but there is no performance loss attributable to a decrease in connectivity from the host side. The process does not impact the host (e.g., invoke host-pathing operations), so there is no dependency on that software functioning correctly or even being present at all. Online upgrades are performed in a manner that mitigates outages, disruptions, and performance impairments that are both foreseen and unforeseen.

The above-described systems and methods can be implemented in digital electronic circuitry, in computer hardware, firmware, and/or software. The implementation can be as a computer program product (i.e., a computer program tangibly embodied in a computer readable medium). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The computer readable medium can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end storage. The back-end component can, for example, be a single hard drive, blade servers, RAID devices, Fibre Channel switch modules, SCSI-compatible disk devices, and/or other storage devices. The above described techniques can be implemented in a distributing computing system that includes a front-end component. The front-end component can, for example, be a host, e.g., a client computer having a graphical user interface and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks. Examples of storage area networks include a storage area network (SAN), Fibre Channel SAN (FC SAN), and/or the like. A mapping layer can be used to facilitate low-level protocols to convert frames to packets to ride over IP (iFCP), storage area network over IP (SANoIP), mapping SCSI over Fibre Channel Protocol (FCP) over IP, internet SCSI (iSCSI), iSCSI extensions for remote DMA (iSER), HyperSCSI to transport SCSI directly over Ethernet, Fiber Connection (FICON), Advanced Technology Attachment (ATA) over Ethernet (AoE), and/or the like.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method executed by a management server in communication with a switching fabric, the switching fabric being in communication with a host and a data storage, the method comprising:

creating a takeover target based on a primary target such that the takeover target has at least some of the same attributes as the primary target, the primary target being part of a virtual data path between the host and the data storage, the data storage comprising a plurality of data storage devices, the primary target facilitating the host performing system input and output operations in connection with data read and write operations on one or more of the data storage devices;

modifying metadata associated with the virtual data path to expose the takeover target to the host so that the takeover target becomes part of the virtual data path; and unexposing the primary target from the host so that the primary target is no longer part of the virtual data path;

wherein if and only if a delay between exposing the takeover target and unexposing the primary target is below a threshold amount of time, the host does not detect a change of targets in the virtual data path and does not register an error condition with respect to the change of targets in the virtual data path; and wherein if and only if the delay between exposing the takeover target and unexposing the primary target is not below the threshold amount of time, the host detects a change of targets in the virtual data path and registers an error condition with respect to the change of targets in the virtual data path.

2. The method of claim 1, further comprising:
modifying the metadata to expose the primary target to the host so that the primary target becomes part of the virtual data path; and
unexposing the takeover target from the host so that the takeover target is no longer part of the virtual data path;
wherein if and only if a second delay between exposing the primary target and unexposing the takeover target is below the threshold amount of time, the host does not detect a change of targets in the virtual data path and does not register an error condition with respect to the change of targets in the virtual data path; and
wherein if and only if the second delay between exposing the takeover target and unexposing the primary target is not below the threshold amount of time, the host detects a change of targets in the virtual data path and registers an error condition with respect to the change of targets in the virtual data path.

3. The method of claim 1, further comprising modifying at least one of a hardware, a software, or a firmware associated with the primary target, wherein the modification does not affect the virtual data path.

4. The method of claim 3, wherein the modification comprises upgrading the software, upgrading the firmware, repairing the hardware, replacing the hardware, power cycling the hardware, rebooting the hardware, or any combination thereof.

5. The method of claim 1, wherein the error condition is a fail over from a first port to a second port.

6. The method of claim 1, wherein the error condition is a standard system notification.

7. The method of claim 1, wherein the intelligent switching fabric comprises a network infrastructure, the network infrastructure supporting a computer to computer communication, storage to storage communication, computer to storage communication, or any combination thereof.

8. The method of claim 7, wherein the network infrastructure comprises Fibre channel, Infiniband, SCSI, iSCSI, TCP/IP, or any combination thereof.

9. The method of claim 1, wherein exposing the takeover target comprises resolving a namespace conflict.

10. The method of claim 9, wherein resolving comprises exposing a target world wide name, a virtual target world wide name, or any combination thereof.

11. The method of claim 1, wherein exposing the takeover target comprises redirecting a host command from the target node to the takeover node.

12. The method of claim 11, wherein the host command comprises an input and output operation.

13. The method of claim 1, wherein the plurality of data storage devices comprises one or more of: single discs, flash drives, tape drives, redundant arrays of independent discs (RAID), data servers, and combinations thereof.

14. The method of claim 1, wherein the attributes comprise one or more of an identical volume exposure, a world wide name, a small computer systems interface identity, or any combination thereof.

15. A system comprising:
a switching fabric in communication with a host and a data storage, the data storage comprising a plurality of data storage devices, the switching fabric facilitating the host performing system input and output operations in connection with data read and write operations on one or more of the data storage devices;
a primary target within the switching fabric;
a virtual data path associated with the host, the primary target, and the data storage; and
a management server in communication with the switching fabric configured to:
create a takeover target based on the primary target such that the takeover target has at least some of the same attributes as the primary target;
modify metadata associated with the virtual data path to expose the takeover target to the host so that the takeover target becomes part of the virtual data path; and
unexpose the primary target from the host so that the primary target is no longer part of the virtual data path;
wherein if and only if a delay between exposing the takeover target and unexposing the primary target is below a threshold amount of time, the host does not detect a change of targets in the virtual data path and does not register an error condition with respect to the change of targets in the virtual data path; and
wherein if and only if the delay between exposing the takeover target and unexposing the primary target is not below the threshold amount of time, the host detects a change of targets in the virtual data path and registers an error condition with respect to the change of targets in the virtual data path.

16. The system of claim 15, wherein:
the switching fabric is configured to modify the metadata to expose the primary target to the host so that the primary target becomes part of the virtual data path; and
the management server is further configured to unexpose the takeover target from the host so that the takeover target is no longer part of the virtual data path;
wherein if and only if a second delay between exposing the primary target and unexposing the takeover target is below the threshold amount of time, the host does not detect a change of targets in the virtual data path and does not register an error condition with respect to the change of targets in the virtual data path; and
wherein if and only if the second delay between exposing the takeover target and unexposing the primary target is not below the threshold amount of time, the host detects a change of targets in the virtual data path and registers an error condition with respect to the change of targets in the virtual data path.

17. The system of claim 15, wherein the switching fabric is further configured to:
receive commands from the management server; and
manage a virtual data path exception, a virtual data path error, or both.

18. The system of claim 15, wherein:
the primary target is associated with a primary node; and
the takeover target is associated with a takeover node.

19. The system of claim 18, wherein the primary node, the takeover node, or both comprise:
a first network card configured to communicate with the switching fabric; and
a second network card configured to communicate with the management server.

20. The system of claim 15, wherein the data storage is configured to store the metadata.

21. The system of claim 15, wherein the virtual data path comprises a small computer system interface (SCSI) target connection, a switched fabric connection, a redundant array of inexpensive discs (RAID) connection, or any combination thereof.

22. A computer program product, tangibly embodied in a non-transitory computer readable medium, the computer program product including instructions being operable to cause a data processing apparatus to:

create a takeover target based on a primary target such that the takeover target has at least some of the same attributes as the primary target, the primary target being part of a virtual data path between a host and a storage device, the data storage comprising a plurality of data storage devices, the primary target facilitating the host performing system input and output operations in connection with data read and write operations on one or more of the data storage devices;

modify metadata associated with the virtual data path to expose the takeover target to the host so that the takeover target becomes part of the virtual data path; and unexpose the primary target from the host so that the primary target is no longer part of the virtual data path;

wherein if and only if a delay between exposing the takeover target and unexposing the primary target is below a threshold amount of time, the host does not detect a change of targets in the virtual data path and does not register an error condition with respect to the change of targets in the virtual data path; and wherein if and only if the delay between exposing the takeover target and unexposing the primary target is not below the threshold amount of time, the host detects a change of targets in the virtual data path and registers an error condition with respect to the change of targets in the virtual data path.

23. A system comprising:

a virtual path between a host and a storage device;

means for creating a takeover target based on a primary target such that the takeover target has at least some of the same attributes as the primary target, the primary target being part of the virtual data path between the host and the storage device, the data storage comprising a plurality of data storage devices, the primary target facilitating the host performing system input and output operations in connection with data read and write operations on one or more of the data storage devices;

means for modifying metadata associated with the virtual data path to expose the takeover target to the host so that the takeover target becomes part of the virtual data path; and means for unexposing the primary target from the host so that the primary target is no longer part of the virtual data path;

wherein if and only if a delay between exposing the takeover target and unexposing the primary target is below a threshold amount of time, the host does not detect a change of targets in the virtual data path and does not register an error condition with respect to the change of targets in the virtual data path; and wherein if and only if the delay between exposing the takeover target and unexposing the primary target is not below the threshold amount of time, the host detects a change of targets in the virtual data path and registers an error condition with respect to the change of targets in the virtual data path.

* * * * *